July 10, 1951     W. H. PHELPS     2,559,897
POWER MOWER

Filed Sept. 24, 1947     2 Sheets—Sheet 1

Inventor:
William H. Phelps
Chritton, Schroder, Merriam & Hofgren
Attorneys

July 10, 1951 W. H. PHELPS 2,559,897
POWER MOWER
Filed Sept. 24, 1947 2 Sheets-Sheet 2

Inventor:
William H. Phelps
By:
Chritton, Schroeder, Merriam & Hofgren
Attorneys

Patented July 10, 1951

2,559,897

UNITED STATES PATENT OFFICE 2,559,897

POWER MOWER

William H. Phelps, Ralston, Nebr.

Application September 24, 1947, Serial No. 775,932

9 Claims. (Cl. 56—25.4)

This invention relates to power mowers of the type with a horizontally rotating blade, and more particularly to an improved vehicle for carrying the rotating blade.

The primary object of the invention is to provide an improved metal platform with special baffles for guarding the blade and enabling the blade to cut the grass into a fine mulch which forms an excellent fertilizer for the grass.

Another object of the invention is to provide an improved guard for the front of the machine which may be positioned or adapted to the particular cutting requirements of the machine.

Another object of the invention is to provide an improved mounting for the driven shaft of the blade so that, when desired, the front guard may be removed and the blade positioned so that it will rotate beyond the front edge of the platform and enable it to cut tall and heavy vegetation without requiring the stalks of the vegetation to be bent under the platform.

A further object of the invention is to provide independent adjustable wheel mountings for each of the wheels which will enable the wheel base of the machine to be shortened or lengthened, permit the height of the cut to be varied over a wide range, and to permit the platform to be tilted in a desired direction while it is cutting grass or being used to scarify the ground. The individual wheel mountings also permit either of the front wheels to be removed entirely and the machine operated on three wheels, when it is desired to cut vegetation very close to a wall or a structure running in the same direction as the travel of the machine.

The invention is illustrated in a preferred embodiment in the accompanying drawings, in which—

Figure 1:
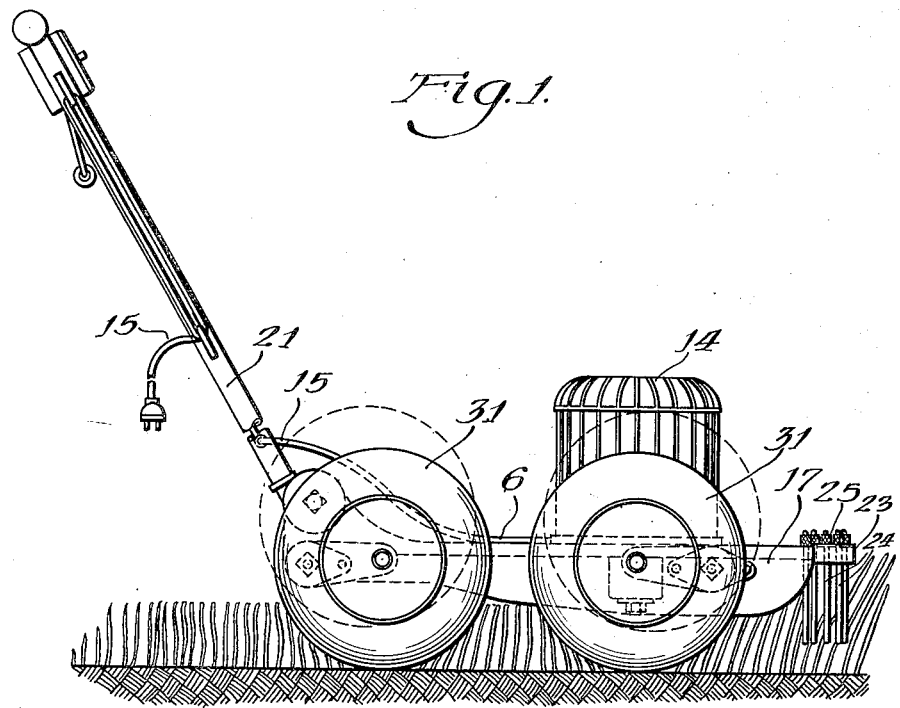
Figure 2:
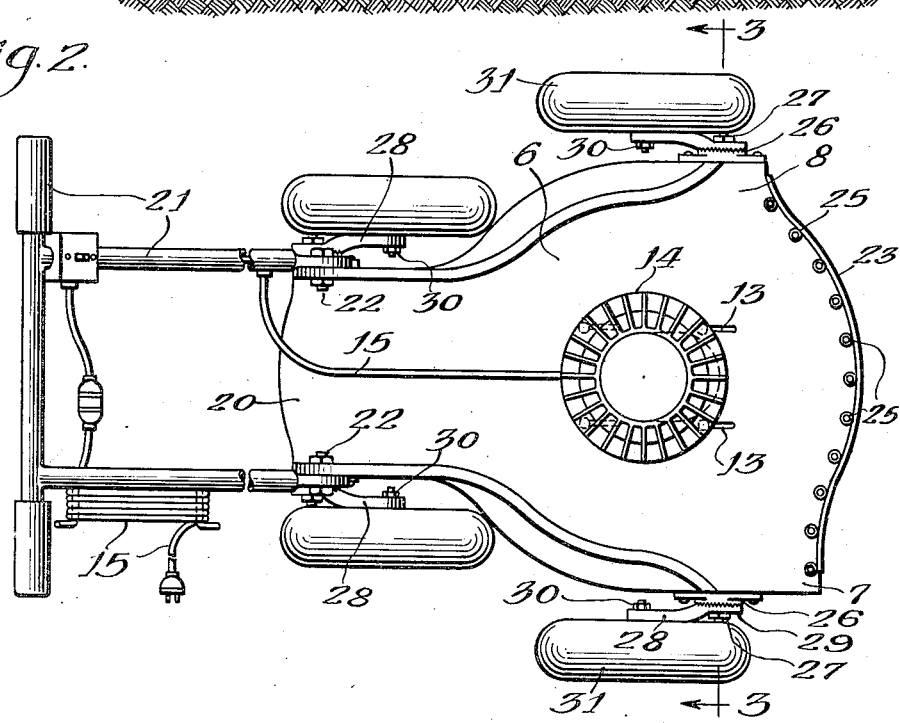
Figure 3:
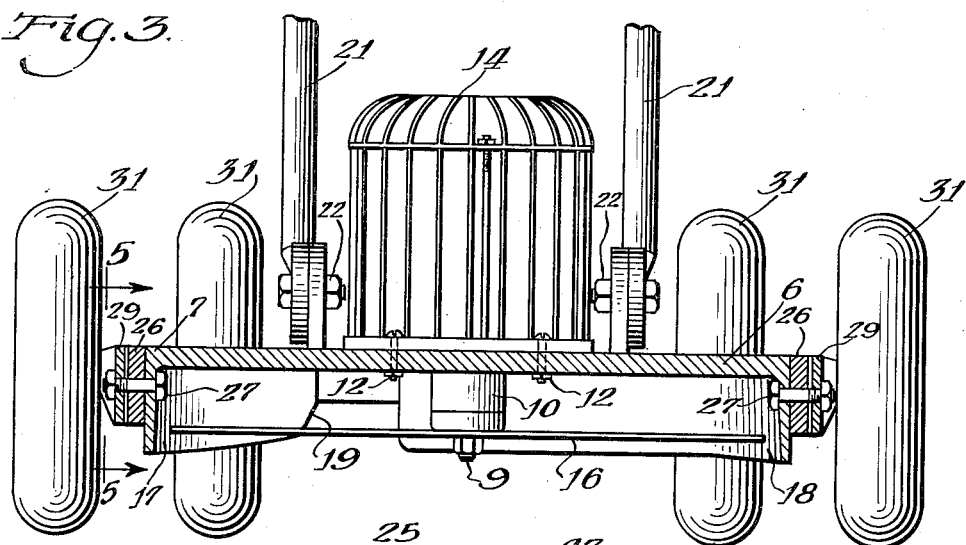
Figure 4:
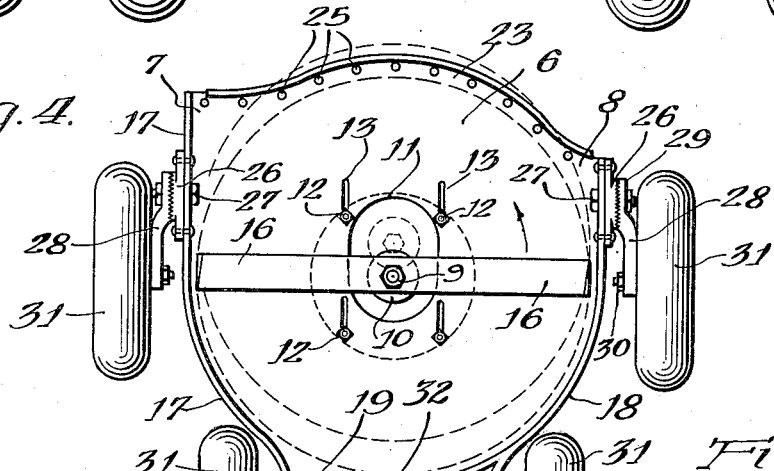
Figure 5:
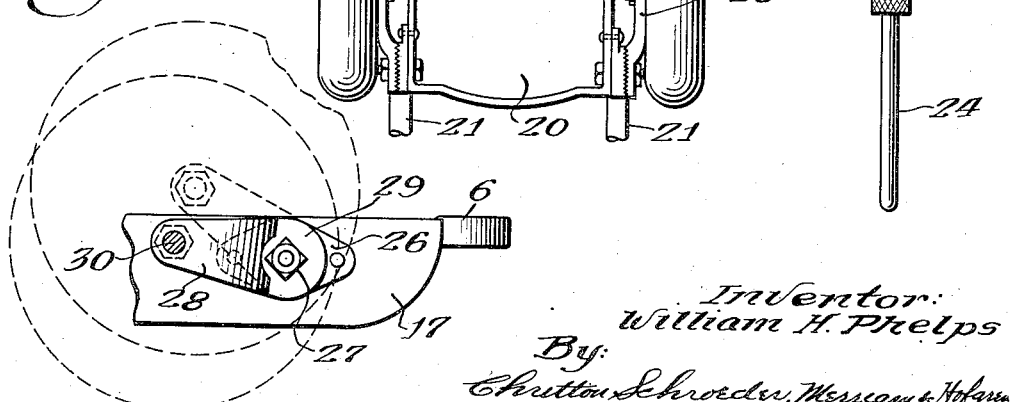

Figure 1 is a side elevational view of a machine embodying the invention; Fig. 2, a top plan view of the same; Fig. 3, a front vertical sectional view, taken as indicated at line 3—3 of Fig. 2; Fig. 4, a bottom plan view of the machine; Fig. 5, a fragmentary elevational view, showing how the wheels may be adjusted with respect to the platform; and Fig. 6, an elevational view of one of the guard pins.

In the embodiment illustrated, a metal platform 6, preferably of a cast aluminum alloy, is of irregular shape, having a widened front portion with its right corner portion 7 extending forwardly a little beyond its left corner portion 8, as viewed in Fig. 2. A vertical driven shaft 9 is journalled in the thrust bearing 10 which extends through a hole 11 in the platform, and is adjustably secured to the platform by bolts 12 extending through longitudinally elongated slots 13 in the platform. In the embodiment illustrated, a shaft is driven by an electric motor 14 having wiring connections 15 to a source of power. However, it will be understood that the shaft may be driven by a prime mover, such as a gasoline engine, if preferred.

The lower end of the shaft 9 is provided with a blade 16, having its leading edges sharpened. As best shown in Figs. 3 and 4, the platform is provided on its lower side with a pair of curved baffles 17 and 18. The baffle 17 extends from the corner 7 rearwardly in a curved path, around the adjacent side of the path of the blade, to the rear portion of the machine. Preferably, that baffle is tapered in depth, so that it is about an inch longer at the front of the platform than at the rear. The baffle 18 is also tapered in depth, and extends from the corner 8, around the adjacent side of the path of the blade, to the rear end of the machine. This baffle, at a slight distance radially outwardly from the rear portion of the outer path of the blade, is formed with an inner, curved baffle portion 32 extending partway towards the baffle 17, but leaving a gate or opening 19 through which some of the cut grass may be thrown.

This arrangement of the baffles with respect to the blade controls the air currents underneath the machine, and provides control of the grass clippings as they are cut off. It has been found that the fine mulch is produced and the grass is chopped up so that one-fifth of it is cut into an extremely fine paste-like mass, a similar portion of the clippings is chopped into pieces of about one-eighth of an inch, another fifth is chopped into pieces one-fourth to one-half inch in length, another fifth into pieces less than one inch in length, and the remaining fifth escapes at lengths a little longer than one inch. Of course, these figures are approximate and will vary some, depending on the length and condition of the grass being cut. It will be noted that the baffle 18 covers about two-thirds of the space between the rear of the platform and the baffle 17. It is through the gate 19 that most of the clippings escape from the machine. Most of the clippings are carried around and thrown against the front of the baffle 17, and they are run through again and again to provide a control of clipping size to form the type of mulch described above that will quickly disappear in the growing grass without requiring raking or being heavy enough to pack down and damage the growing grass.

As shown in Figs. 2 and 3, the rear portion of the platform 6 is narrower than the front, and has a rearwardly extending portion 20, to which handle-bars 21 are secured at a desired angular adjustment by means of bolts 22.

Figure 6:
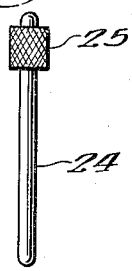

Preferably, the front portion of the platform is curved, as indicated at 23, and has a series of downwardly extending holes to receive loosely fitting guard pins 24, which have knurled heads 25, as shown in Fig. 6. Sufficient clearance is provided between the pins and the holes, so that if they strike the ground, instead of digging in they may slide upwardly in the holes. These pins provide an effective front guard for ordinary mowing operations. If it is desired to cut high weeds, the pins may be removed and the blade adjusted forwardly by the bolts 12, as explained above.

The mower is provided with four separate wheel mountings, two secured to the front portion of the machine, and two to the narrow rearward extension 20. Each wheel mounting has a vertical securing plate 26, which has a center opening to receive a bolt 27, and the plate is disposed in a plane parallel to the longitudinal axis of the platform. An arm 28 has a toothed plate 29 at one end to engage the securing plate 26, and is angularly adjustable on the bolt 27. The other end of the arm supports a bearing 30 for a wheel 31.

The individual wheel mountings permit the arms 28 to be adjusted so that the machine has a short wheel base, as illustrated in the drawings. This arrangement makes the machine easy to steer and operate on a smooth turf. However, if the ground is rough, the wheel base may be greatly increased by adjusting the front arms forwardly and the rear arms rearwardly. If it is desired to use the machine to tear up turf, a scarifying blade may be substituted for the blade 16, and the wheels adjusted so that the platform is inclined forwardly and downwardly, so that the tips of the blade will tear out the turf. The depth of cut also may be regulated by a downward pressure on the handle bars 21.

The foregoing detailed description is given for clearness of understanding only, and no unnecessary limitations should be understood therefrom, for some modifications will be obvious to those skilled in the art.

I claim:

1. In a power mowing machine, a horizontal metal platform, a vertical driven shaft journalled in said platform and provided on its lower end with a horizontally rotatable cutter blade, said platform having a wide front portion and a narrow rear portion, downwardly extending baffles on the side edges of said platform and terminating at one end adjacent the rear end of said narrow rear portion, one of said baffles having a portion extending partway across the front end portion of the narrow rear portion to form a restricted opening for cut grass.

2. A power mower as claimed in claim 1, in which said restricted opening is positioned on one side of the longitudinal center line of the platform so that during rotation of the blade the adjacent end of the blade passes by said opening before it passes by said partway baffle extension.

3. In a power mowing machine, a horizontal platform, a vertical driven shaft journalled in said platform and having mounted on its lower end a horizontally rotatable cutter blade, said platform having a wide front portion and a narrow rear portion, one front corner of said wide front portion extending farther forwardly than the other front corner thereof, a downwardly extending baffle on each of the side edges of the platform extending from said front corners respectively to the respective rear end corners of the narrow rear portion, the baffle from the rearmost one of said front corners having a bifurcation at the front end of said narrow rear end, one leg of said bifurcation extending partway across the front end of the narrow rear end to form a restricted opening for cut grass on the lead side of the longitudinal center line of the platform relative to the direction of rotation of the adjacent end of the cutter blade, said bifurcation leg and portions of the two baffles generally following the curvature of one-half of the circumference of the rotation area of the cutter blade, whereby the cut grass is carrier around and thrown against the extended front corner baffle portion and run through the machine a plurality of times, with only a portion escaping through said restricted opening, so as to provide a control of clippings size to make an effective mulch for the lawn.

4. A mowing machine as claimed in claim 3, in which said first mentioned baffles are tapered in depth from front to rear of the platform.

5. In a power mower, a horizontal platform, a vertical driven shaft journalled in said platform and having mounted on its lower end a horizontally rotatable cutter blade, four wheel mountings on the platform, each of said mountings being provided with a bearing and a wheel, each of said wheel mountings having a vertical securing plate fixed to a side edge of the platform, an arm having one end swingably mounted on said securing plate and the other end having said wheel rotatably mounted therein, and locking means for locking said arm selectively in various positions of adjustment, said arms for each of said four wheels being individually adjustable to enable inclination of the platform as desired, said wheel mountings being arranged for adjusting said wheels in parallel vertical planes and to swing the front pair of wheels and the rear pair of wheels toward each other to shorten the wheel base and swing them away from each other to lengthen the wheel base as desired.

6. In a power mowing machine, a horizontal metal platform provided with front corner portions and rearwardly extending handle-bars, a vertical driven shaft journalled in said platform and provided at its lower end with a cutter blade, four wheel mountings on the platform, each of said mountings being provided with a bearing and a wheel, guard means on the underside of said platform including a pair of downwardly extending baffles which extend rearwardly from the front corner portions of the platform to the rear of said platform, said baffles being of greatest depth near the front portion of the platform and decreasing in depth from near their front end toward the rear end and being of smallest depth adjacent the rear end to provide for proper escape of cut grass from under the platform to give good mulching effect for a lawn, the front portion of the platform being wider than the rear portion and said rear portion having a narrow short rearward extension to which the rear wheel mountings and handle-bars are adjustably secured, said rearward extension having on its underface a baffle portion extending from one of said pair of baffles toward but stopping short of the other baffle of said pair to form a restricted opening through which some of the cut grass may be thrown.

7. In a power mowing machine, a horizontal metal platform provided with rearwardly extending handle-bars, a vertical driven shaft journalled in said platform and provided at its lower end with a cutter blade, four wheel mountings on the platform, each of said mountings being provided with a bearing and a wheel, guard means on the underside of said platform including a pair of downwardly extending baffles which curve rearwardly from the front corner portions of the platform to a gate near the rear of said platform, said baffles being of greatest depth near the front portion of the platform and decreasing in depth from near their front end toward the rear end and being of smallest depth adjacent the rear end to provide for proper escape of cut grass from under the platform to give best mulching effect for a lawn, each of said wheel mountings having an arm, one end of each of said arms carrying one of said bearings and the other end being angularly adjustable on a vertical securing plate provided on the platform and disposed parallel to the longitudinal axis of said platform, the adjacent contacting faces of each of said arms and its said securing plate having interengaging serrations, and means for selectively locking said serrations together in various positions of adjustment.

8. In a power mowing machine, a horizontal platform, a vertical driven shaft in said platform and provided on its lower end with a horizontally rotatable cutter blade, said platform having a wide front portion and a narrow rear portion, the front edge portion of the platform having corners and being forwardly curved between said corners, said front edge portion having a series of downwardly extending openings, headed guard pins removably mounted in said openings, power means on the platform for rotating said shaft and cutter, said power means being adjustable longitudinally of said platform so that when said guard pins are removed the power means may be adjusted forwardly to carry the front side of the path of rotation of the ends of the cutter blade beyond the front edge of the platform for cutting weeds that are too high to be effectively cut underneath the platform.

9. A machine as claimed in claim 8, in which one front corner of said wide front portion extends farther forwardly than the other front corner thereof.

WILLIAM H. PHELPS.

REFERENCES CITED

The following references are of record in the file of this patent:

UNITED STATES PATENTS

| Number | Name | Date |
|---|---|---|
| 1,849,953 | Phalen | Mar. 15, 1932 |
| 2,208,972 | Goodall | July 23, 1940 |
| 2,308,076 | Hainke | Jan. 12, 1943 |
| 2,329,185 | Coddington | Sept. 14, 1943 |